(12) United States Patent
Henrion et al.

(10) Patent No.: US 8,391,432 B2
(45) Date of Patent: Mar. 5, 2013

(54) DATA SERIALIZER

(75) Inventors: Carson D. Henrion, Fort Collins, CO (US); Daniel A. Berkram, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1883 days.

(21) Appl. No.: 11/199,431

(22) Filed: Aug. 8, 2005

(65) Prior Publication Data

US 2007/0030934 A1 Feb. 8, 2007

(51) Int. Cl.
*H04L 7/00* (2006.01)

(52) U.S. Cl. ......... 375/354; 375/355; 375/362; 375/357

(58) Field of Classification Search .................. 375/354, 375/355
See application file for complete search history.

(56) References Cited

U.S. PATENT DOCUMENTS

| | | | | |
|---|---|---|---|---|
| 3,685,021 | A * | 8/1972 | Mauch et al. | 360/22 |
| 5,714,904 | A * | 2/1998 | Jeong | 327/407 |
| 6,107,946 | A * | 8/2000 | Jeong | 341/101 |
| 6,686,856 | B1 * | 2/2004 | Wang et al. | 341/100 |
| 6,741,193 | B2 * | 5/2004 | Nagata | 341/101 |
| 7,253,754 | B2 * | 8/2007 | Takeuchi et al. | 341/100 |
| 2001/0031027 | A1 * | 10/2001 | Lindsay | 375/354 |
| 2003/0043943 | A1 * | 3/2003 | Chang et al. | 375/354 |
| 2004/0184572 | A1 * | 9/2004 | Kost et al. | 375/354 |
| 2006/0112293 | A1 * | 5/2006 | Przybysz et al. | 713/400 |
| 2007/0014388 | A1 * | 1/2007 | Buchholtz | 375/354 |

* cited by examiner

*Primary Examiner* — Kenneth Lam

(57) ABSTRACT

A method of serializing a data stream includes passing a series of data words from a source in a first clock domain to a serializer in a second clock domain and passing valid signals from the source to the serializer indicating when each of the data words is available from the source. The serializer divides each of the data words into a plurality of portions for serial transmission. The method also includes synchronizing the serializer and the source based on the first of the valid signals.

10 Claims, 9 Drawing Sheets

DATA SERIALIZER

BACKGROUND

A data serializer is an electronic circuit that is used to connect a wide data bus to a narrow data bus. The wide data bus contains a relatively large number of data bits to transmit a data word in parallel fashion, with all the data bits being transmitted simultaneously. The narrow data bus contains a relatively few number of data bits to transmit the same data word in a more serial fashion, where the data word is transmitted in several smaller pieces, one after another. The narrow data bus operates at a higher frequency than the wide data bus so that the same amount of data can pass through the busses in a given period of time. For example, a typical embodiment of a serializer may receive data from a core operating at a low frequency and convert it into a high frequency data stream having fewer bits than the wider core data bus. The serializer receives a data word from the core, divides it into several pieces, and transmits those pieces one by one on the narrow data bus, generally before the next data word is available from the core. The serializer operates at the interface between the different clock domains of the core data bus and the narrow data bus. Conventional methods of synchronizing the core clock and the high speed serializer clock can require elaborate clock alignment circuits and add undesirable latency to the system.

SUMMARY

An exemplary method of serializing a data stream includes passing a series of data words from a source in a first clock domain to a serializer in a second clock domain and passing valid signals from the source to the serializer indicating when each of the data words is available from the source. The serializer divides each of the data words into a plurality of portions for serial transmission. The method also includes synchronizing the serializer and the source based on the first of the valid signals.

BRIEF DESCRIPTION OF THE DRAWINGS

Illustrative embodiments are shown in the accompanying drawings as described below.

DESCRIPTION

Figure 1:
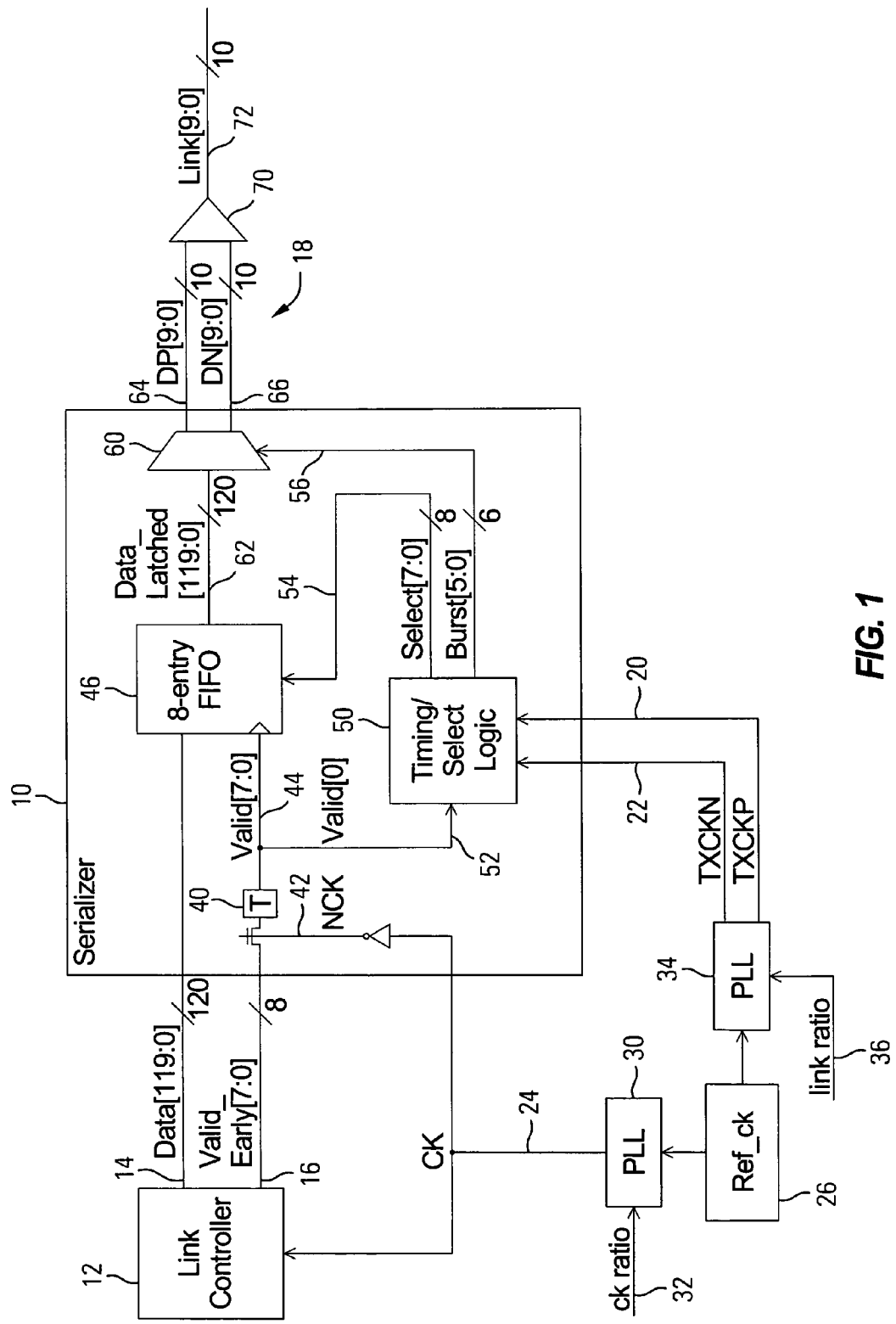
FIG. 1 is a block diagram illustrating an exemplary apparatus for serializing a data stream.

The drawings and description, in general, disclose a method and apparatus for serializing a data stream. In an exemplary embodiment, data is provided from a relatively low frequency source to a serializer operating at a higher frequency. For example, a processor core operating at a clock frequency of 667 MHz may provide data to a serializer operating at a clock frequency of 6.25 GHz. The serializer buffers the data from the core and breaks the data words into smaller pieces for high speed serial transmission. (Note that the term "serial" refers herein to a transmission of a signal in multiple portions rather than simultaneously. This does not necessarily mean that a signal is transmitted one data bit at a time.) The core clock and the serializer clock are not aligned, although they may be generated from the same reference clock. The serializer is synchronized with the core data interface, but the probability of a meta-stable event is reduced by synchronizing once, such as at reset when the first data is about to be made available to the serializer. The frequency of synchronization is therefore equal to the reset frequency and is extremely low, making the probability of a meta-stable event extremely low. By omitting clock alignment circuitry, the serializer can be much smaller and less complex than if the clocks were aligned.

Because data is not necessarily provided for serial transmission every core clock cycle, the core or other source provides one or more valid signals to the serializer along with the data, indicating when data is available. Note that the term "valid signal" is used herein to describe a signal that indicates when the associated data is or will soon be available and ready to be latched into the serializer or otherwise captured, not that the signal itself is "valid". In an exemplary embodiment, multiple valid signals are provided along with the data, functioning as rotating one-hot pointers indicating which data word in the stream is next. For example, 8 valid signals may be provided, wherein the first would be asserted when the first data word was coming, the second valid signal would be asserted for the second data word, the third valid signal would be asserted for the third data word, etc, and the process would start over after eight data words.

In one exemplary embodiment, the valid signal is asserted one core clock cycle before the data is actually transmitted to the serializer. The pattern to be transmitted on the valid signal is known in advance so that it can be sent before the data. Sending the valid signal one cycle before the data allows the valid signal to be synchronized before the data arrives. The valid signal is effectively over-sampled by the higher frequency serializer clock. The serializer is synchronized by the arrival of the first asserted valid signal, and the data is transparently clocked into a memory in the serializer by the previously sent first valid signal which has been delayed by a half cycle of the core clock. This creates a half cycle timing path on the data between the core and the serializer, which may be increased if needed based on the distance between the core and the serializer. The transparent clocking of the data into the serializer memory allows the data to be used as soon as it arrives in the serializer, decreasing the overall transmit latency. For example, the serializer memory may comprise a first-in-first-out (FIFO) memory made at least in part of transparent latches. The output of a transparent latch is set equal to the input at any time when the enable (clock) input is high. When the enable input of a transparent latch is low, the output maintains the value it had when enable was last high. Therefore, because the valid signal is asserted before the data arrives, data arriving at the serializer input is available almost immediately, in contrast to serializers that clock data in using the core clock (using flip-flops, or pulse latches), in which data might not be available until the next core clock edge. Once in serializer memory, the data may be sampled into the serializer clock domain with the fine grain resolution of the high frequency serializer clock. The data may thus be used within one serializer clock cycle of its arrival in the memory, which may be a fraction of the core clock cycle.

The data flow through an exemplary serializer 10 is illustrated in the block diagram of FIG. 1. A link controller 12 in a core provides a 120-bit data bus (Data[119:0]) 14 and 8 valid signals (Valid_Early[7:0]) 16. The serializer 10 serializes the 120-bit data bus 14 into a 20-bit bus (DP[9:0], DN[9:0]) 18. The link controller 8 transmits one 120-bit data word per core clock cycle. The 20-bit output bus 18 is double pumped and transmits twenty data bits per serializer clock cycle. The serializer 10 uses two clocks, TXCKP 20 and TXCKN 22 that are 180 degrees out of phase with each other. (Note that the serializer may have just one clock, although latency may increase in that embodiment. The term "serializer clock" may be used herein at various times to refer to both clocks TXCKP 20 and TXCKN 22 or to just one of the two.) The core clock CK 24 (or the clock that is used to clock data out of the link controller 12) and the serializer clocks TXCKP 20 and TXCKN 22 may be based on the same reference clock 26. For example, a phase-locked loop (PLL) 30 may be used to generate the core clock CK 24 at a predetermined ratio 32 to the reference clock 26 and another PLL 34 may be used to generate the serializer clock 20 and 22 at another predetermined ratio 36. This effectively creates a pseudo-synchronous boundary between the serializer clock domain and the core clock domain. The first rising edge of a valid signal is the only synchronizing event between the core clock CK 24 and the serializer clocks TXCKP 20 and TXCKN 22. The serializer clock 20 and 22 is not purposely aligned with the core clock 24, that is, there is no clock alignment circuitry used to align the clocks 20 and 22 and 24, although the clocks may coincidentally be in alignment during operation.

The valid signal Valid_Early[7:0] 16 is sampled into the serializer 10 by a transparent latch 40 (one latch per bit) that is clocked by an inverted version NCK 42 of the core clock CK 24, forming a sampled valid signal Valid[7:0] 44. Data is latched into the serializer memory, such as an 8-entry FIFO 46 that can hold 8 120-bit words from the data bus 14. Data is clocked into the FIFO 46 by the sampled valid signal 44. The serializer 10 contains timing/select logic 50 that is synchronized by the first rising edge of the sampled valid signal 44 which appears on the least significant bit Valid[0] 52 of the sampled valid signal 44. The timing/select logic 50 generates a select signal Select[7:0] 54 that selects the oldest stored data word in the FIFO 46 for output. The select signal 54 is an 8-bit wide one-hot signal that changes state with each 120-bit data word being transmitted by the serializer 10. Note that the select signal 54 may contain more or less one-hot bits depending on the number of data words that may be stored in the FIFO 46. The bits of the select signal 54 are each asserted sequentially, starting with Select[0], and are held high for the number of serializer clock cycles need to transmit a 120-bit data word. The timing/select logic 50 also generates a burst signal Burst[5:0] 56 that divides the 120-bit data word into 6 different 20-bit pieces (or portions) in an output multiplexer 60. The 120-bit data (Data_Latched[119:0] 62) from the FIFO 46 is connected to the output multiplexer 60, and the burst signal 56 causes the output multiplexer 60 to output 20 bits of Data_Latched[119:0] 62 at a time on the two 10-bit double-pumped outputs DP[9:0] 64 and DN[9:0] 66. The exemplary burst signal 56 is a 6-bit one-hot signal in which each bit is asserted sequentially for one serializer clock cycle each. Note that the burst signal 56 may contain more or less one-hot bits depending on the number of portions the data word is divided into. A transmit driver 70 may be used to convert the 20-bit double-pumped output 18 to a 10-bit serial bus Link[9:0] 72.

Before describing the timing/select logic 50, the data flow through the FIFO 46 and output multiplexer 60 in the exemplary serializer 10 will be described in greater detail. However, it is important to note that the synchronization in the method and apparatus for serializing a data stream may be applied to other data storage, division and transmission embodiments and is not limited to application with the 8-entry FIFO 46 and output multiplexer 60 described herein. For example, another embodiment of the serializer 10 may buffer only the data word currently being transmitted. The input and output data busses may have any desired number of bits, and each input data word may be divided into any desired number of portions for serial transfer. Additionally, although the exemplary embodiment of the serializer contains an 8-entry FIFO 46 made at least partially of transparent latches, the serializer memory may have any suitable alternative structure, such as a shift register, etc.

Figure 2:
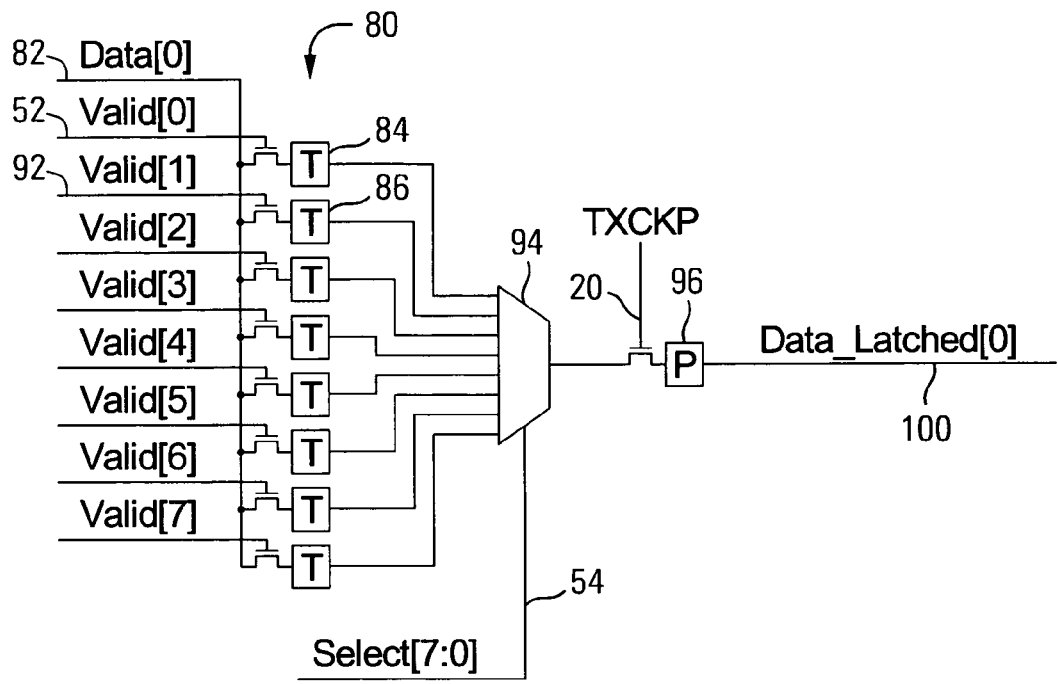
FIG. 2 is a block diagram illustrating an exemplary first-in-first-out (FIFO) for storing data words in the apparatus of FIG. 1.

Referring now to FIG. 2, the exemplary 8-entry FIFO 46 comprises eight transparent latches 80 per bit in the input data word. For the 120-bit input data word used herein, the circuit of FIG. 2 would be repeated 120 times, once for each bit in the 120-bit input data word. The input data bit (e.g., Data[0] 82) is connected to the input of each of the transparent latches 80 (e.g., 84, 86). The transparent latches 80 are clocked by the sampled valid signal 44, with a different bit of the valid signal 44 clocking each of the transparent latches 80 (e.g., 84, 86). For example, the first bit of the valid signal 44, Valid[0] 52, is connected to the clock (or enable) input of the first transparent latch 84, the second bit of the valid signal 44, Valid[1] 92, is connected to the clock input of the second transparent latch 86, etc. Thus, each data word is stored at a different location in the 8-entry FIFO 46 according to the state of the valid signal 44. The oldest (first-in) word is retrieved from the FIFO 46 by the select signal 54 using a multiplexer 94. The multiplexer 94 has 8 inputs, one for each entry in the FIFO 46. As discussed above, the select signal 54 is a one-hot 8-bit signal in which the active line in the signal controls which multiplexer input is connected to the output. For example, if Select [0] is asserted, the multiplexer 94 selects the first entry which was latched in by Valid[0] 52. The output of the multiplexer 94 is latched into a transparent latch 96 by the serializer clock TXCKP 20, forming a Data_Latched[0] signal 100. The 120 bits of the data word are processed substantially simultaneously in the exemplary serializer, forming Data_Latched [119:0], although as will be discussed below, half of the serializer is clocked by serializer clock TXCKP 20 and the other half by serializer clock TXCKN 22 with a half-cycle delay.

Figure 3:
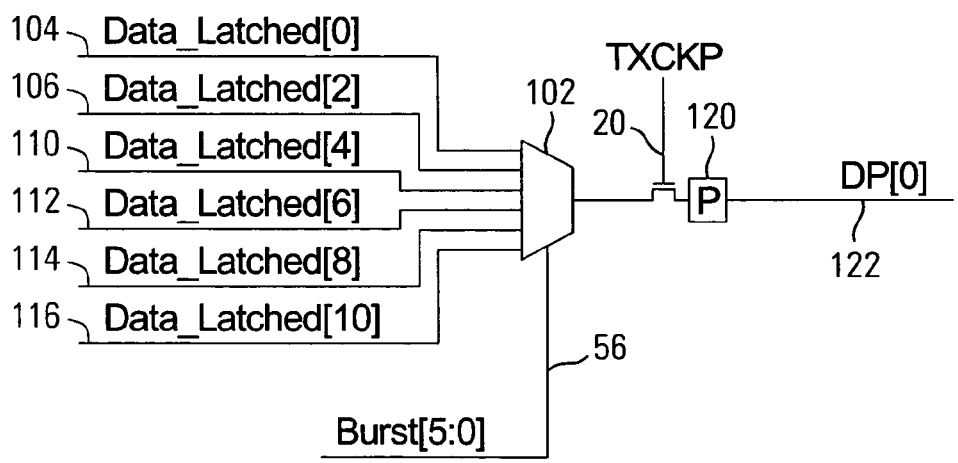
FIG. 3 is a block diagram illustrating an exemplary output multiplexer for selecting data word portions for serial output in the apparatus of FIG. 1.

Referring now to FIG. 3, a one-bit portion 102 of the output multiplexer 60 will be described. Because the 120-bit data word is broken into 6 portions, this one-bit portion of the output multiplexer consists of a 6-input multiplexer 102. The inputs are each connected to one of the Data_Latched[119:0] bits. The illustrated one-bit portion 102 multiplexes Data_Latched[0] 104, Data_Latched[2] 106, Data_Latched[4] 110, Data_Latched[6] 112, Data_Latched[8] 114 and Data_Latched[10] 116. The multiplexer 102 is controlled by the burst signal 56, a one-hot 6-bit signal in which the active line in the signal controls which multiplexer input is connected to the output. For example, if Burst[0] is asserted, the multiplexer 102 selects the first input, Data_Latched[0] 104. The output of the multiplexer 102 is latched into a transparent latch 120 by the serializer clock TXCKP 20, forming the least significant bit DP[0] 122 of the 10-bit DP[9:0] bus 64. Each of the other 19 bits in the two 10-bit busses DP[9:0] 64 and DN[9:0] 66 are processed substantially the same, although half use the TXCKN clock 22.

Half of the FIFO 46 and output multiplexer 60 is based on one phase TXCKP 20 of the serializer clock and the other half is based on the other phase TXCKN 22, providing a double-pumped output. In one exemplary embodiment described herein, the even bits are processed by the TXCKP 20 phase of the serializer clock and the odd bits are processed using the TXCKN 22 phase. The output driver 70 interleaves the bits processed by the TXCKP 20 and TXCKN 22 clocks, putting them back in sequential order for serial transmission. For example, for each 20-bit data word appearing on DP[9:0] 64 and DN[9:0] 66, the output driver 70 interleaves the data bits and transmits a first 10-bit data word consisting of DN[4], DP[4], DN[3], DP[3], DN[2], DP[2], DN[1], DP[1], DN[0], and DP[0], then transmits a second 10-bit data word consisting of DN[9], DP[9], DN[8], DP[8], DN[7], DP[7], DN[6], DP[6], DN[5], and DP[5].

The timing/select logic 50 (FIG. 4) synchronizes the serializer 10 based on the time that the valid signal 16 is first asserted, which occurs in the least significant bit, Valid[0] 52. The timing/select logic 50 is clocked by the high speed serializer clock TXCKP 20 and TXCKN 22. The timing/select logic 50 synchronizes the select signal 54 and the burst signal 56 so that data that has been transparently latched into the serializer 10 is accessed at an appropriate time. Offset logic 132 is applied, applying a selectable delay after Valid[0] 52 is first asserted before a Start_Select signal 134 and Start_Burst signal 136 are asserted to begin the process of clocking data out of the serializer 10. The delay is specified by an Offset_Init[4:0] signal 140, a 5-bit encoded signal that selects one of 32 available offsets or delays. The granularity of the Offset_Init[4:0] signal 140 (one serializer clock cycle) ensures that the data can be selected as soon as it is available. The Offset_Init[4:0] signal may be software programmable, or hard coded, etc. as desired. Select logic 142 and burst logic 144 begin to generate the select signal 54 and burst signal 56 once the Start_Select signal 134 and Start_Burst signal 136, respectively, have been asserted. The Start_Select and Start_Burst signals 134 and 136 are initially unasserted and, once asserted, remain asserted.

Figure 5:
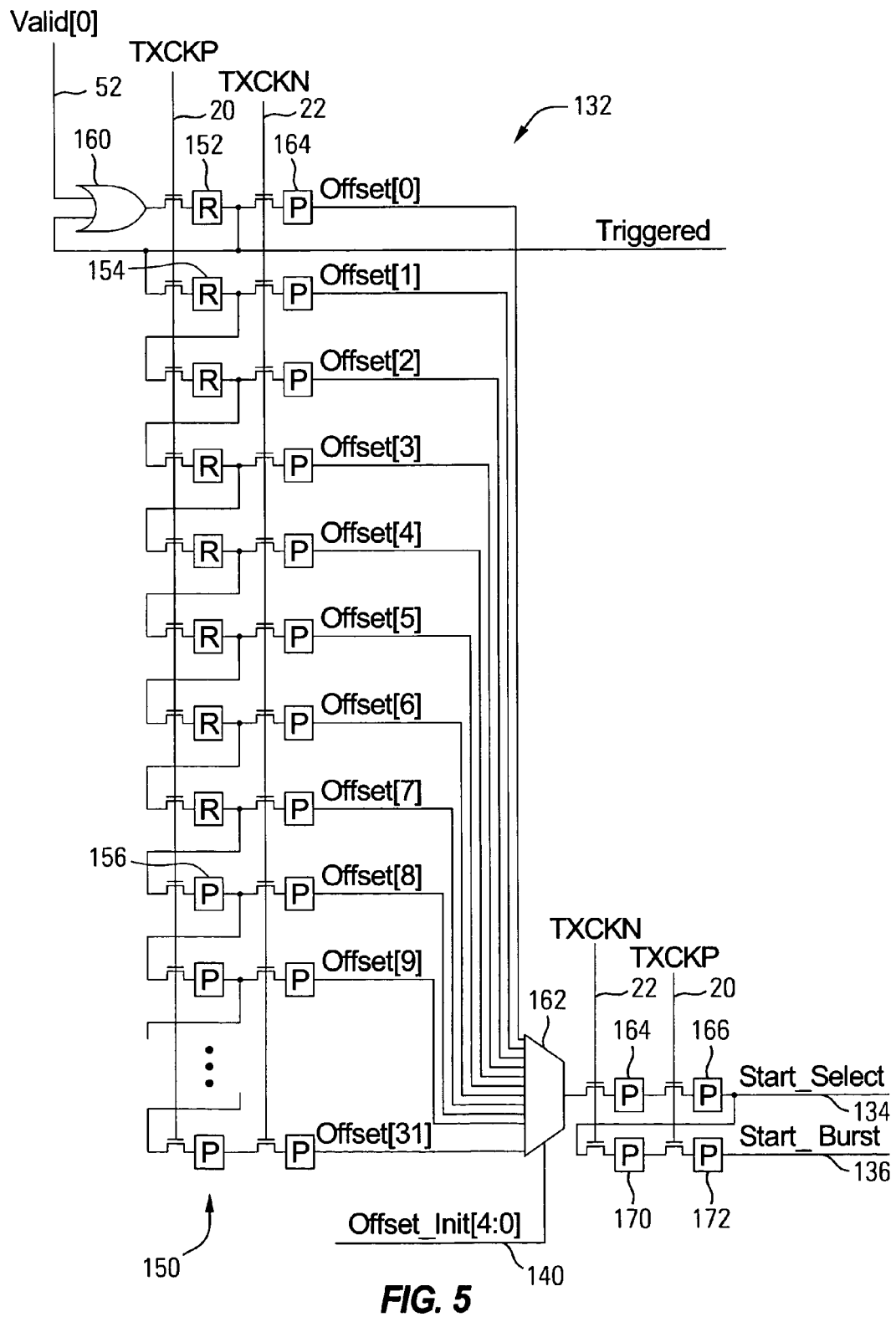
FIG. 5 is a block diagram illustrating an exemplary offset generator for the timing/select logic of FIG. 4.

An exemplary embodiment of the offset logic 132 is illustrated in FIG. 5. The Valid[0] signal 52 passes through a latch chain 150 made at least in part of resolving latches. The exemplary latch chain 150 contains 32 latches, the first 8 of which are resolving latches (e.g., 152, 154) and the remaining 24 of which are pulse latches (e.g., 156). After passing through all 32 latches in the latch chain 150, the Valid[0] signal 52 is fed back to the start of the latch chain 150 where it is combined with the original Valid[0] signal 52 in an OR gate 160. Thus, once the Valid[0] signal 52 has been asserted and a high value has entered the latch chain 150, the high value will be retained during operation. The output of the latch chain 150 is captured by a pulse latch (e.g., 164) at each of the 32 stages in the latch chain 150. The latch chain 150 is clocked by the TXCKP clock 20 and the pulse latches (e.g., 164) are clocked by the TXCKN 22 clock. The desired offset is selected using an offset multiplexer 162 having 32 inputs, each of which is connected to the output of a pulse latch (e.g., 164), as controlled by the Offset_Init[4:0] signal. The output of the offset multiplexer 162 is latched by a pair of pulse latches 164 and 166, clocked by TXCKN 22 and TXCKP 20, thereby asserting the Start_Select signal 134 one serializer clock after the multiplexer 162 output has been asserted. The Start_Select signal 134 is also latched by a pair of pulse latches 170 and 172, clocked by TXCKN 22 and TXCKP 20, to form the Start_Burst signal 136 which is asserted one serializer clock after the Start_Select signal 134 has been asserted.

Figure 4:
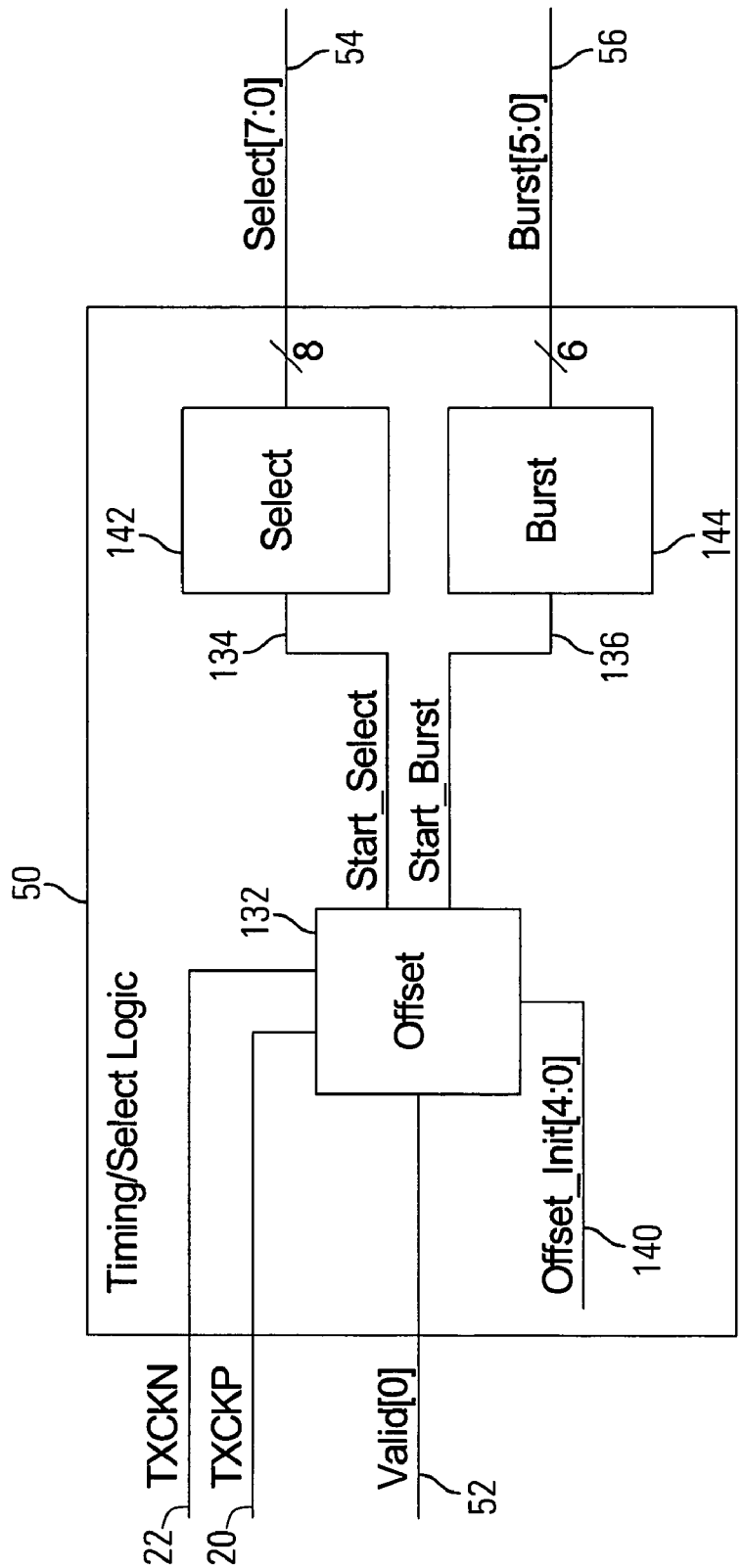
FIG. 4 is a block diagram illustrating exemplary timing/select logic in the apparatus of FIG. 1 for controlling the FIFO and output multiplexer of FIGS. 2 and 3.
Figure 6:
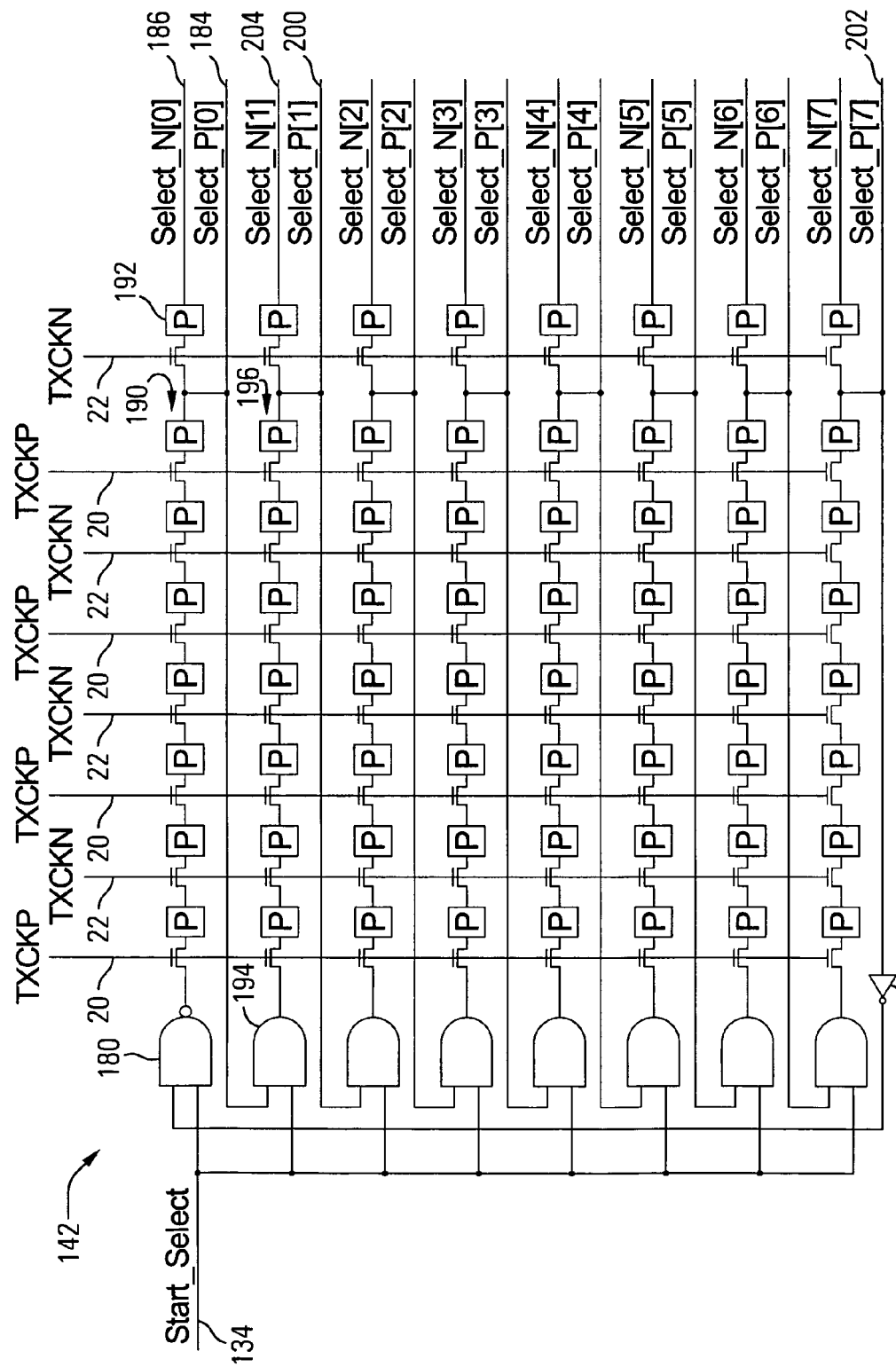
FIG. 6 is a block diagram illustrating an exemplary select generator for the timing/select logic of FIG. 4 for selecting an output entry in the FIFO of FIG. 2.

The select logic 142 (FIG. 6) uses a ring of latches in which an asserted value circulates to generate the 8-bit select signal Select[7:0] 54. As discussed above, half of the serializer 10 is clocked by TXCKP 20 and the other half is clocked by TXCKN 22. Accordingly, the select logic 142 forms two select signals, Select_P[7:0] and Select_N[7:0], where the Select_N[7:0] signal is delayed by one-half cycle of the serializer clock, although the block diagrams of FIGS. 1 and 4 show only one of the two. The Start_Select signal 134 enters the ring of latches through a NAND gate 180, and the output from the end of the ring of latches is inverted in an inverter 182 and fed back into the NAND gate 180 to circulate the asserted value through the ring of latches. The ring of latches contains 8 stages, one for each bit of the select signal output. (Because the select logic 142 actually produces two phase-shifted select signals, Select_P[7:0] and Select_N[7:0], each of the 8 stages generates two output signals.) The least significant bit of the select signals, Select_P[0] 184 and Select_N[0] 186, are formed by sending the output of the NAND gate 180 through a series of seven pulse latches 190, clocked alternately by TXCKP 20 and TXCKN 22, which holds a given state at the output for enough clock cycles for the serializer output multiplexer 60 to run through all its six inputs. (Note that the Select_N[0] 186 and other Select_N signals are latched by an additional pulse latch 192, clocked by TXCKN 22, and therefore are delayed an extra half-cycle of the serializer clock.) The Select_P[0] 184 signal is fed back to the beginning of the next stage, where it is combined in an AND gate 194 with the Start_Select signal 134 before passing through another series of seven pulse latches 196 in the ring to form Select_P[1] 200. The ring of latches continues in this fashion, with the output of each stage being combined with the Start_Select signal 134 in an AND gate at the beginning of the next stage (except for stage 1 which uses a NAND gate 180). During operation, the Start Select signal 134 and the Select_P[7] signal 202 are both unasserted (low), so the output of the NAND gate 180 is asserted (high), and the Select_P[0] and Select_N[0] signals 184 and 186 are both asserted (after a delay long enough for the output of the NAND gate 180 to pass through the series of latches 190 and 192). Because the Select_P[0] signal 184 is asserted but the Start_Select signal 134 is unasserted, the output of the second stage AND gate 194 is unasserted. Select_P[1] 200 and Select_N[1] 204 are therefore unasserted, and so on, such that only the Select_P[0] and Select_N[0] signals 184 and 186 are asserted before the Start_Select signal 134 is asserted. Once the Start_Select signal 134 is asserted, the output of the NAND gate 180 is unasserted and the output of the AND gate 194 is asserted. After those signals have traveled through their respective latch chains 190 and 196, Select_P[0] 184 will be unasserted and Select_P[1] 200 will be asserted, and so on.

Figure 7:
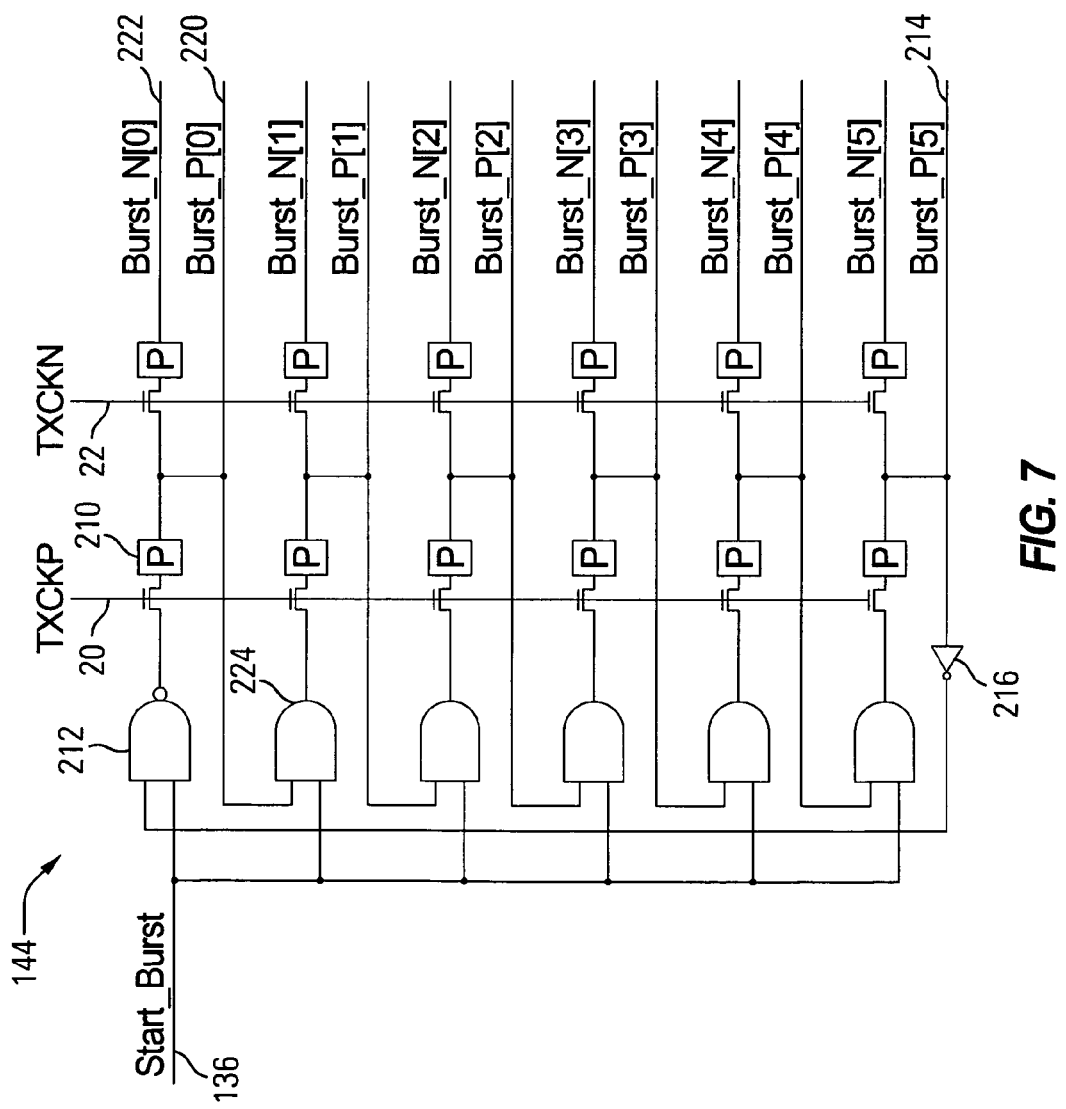
FIG. 7 is a block diagram illustrating an exemplary burst generator for the timing/select logic of FIG. 4 for controlling the output multiplexer of FIG. 3.

Referring now to FIG. 7, the burst logic 144 will be described. This operates in much the same fashion as the select logic 142, except that the chain of pulse latches (e.g., 190, 196) in each stage of the select logic 142 is replaced by a single pulse latch (e.g., 210). The Start_Burst signal 136 is combined with the inverted feedback from the end of the ring of latches in a NAND gate 212. The feedback is taken from the Burst_P[5] signal 214 and inverted in an inverter 216. The output of the NAND gate 212 is latched in a pulse latch 210, clocked by TXCKP 20, to form Burst_P[0] 220. This signal is in turn latched by TXCKN 22 to form Burst_N[0] 222, as well as being fed back to an AND gate 224 at the start of the second stage in the ring. The Start_Burst 136 signal is combined with the feedback from Burst_P[0] 220 in the AND gate 224 and so on. Note that the select and burst logic 142 and 144 may be implemented in any other suitable embodiment to produce the described sequentially asserted signals, such as with a counter, shift register, state machine, etc. Similarly, the one-hot signals (e.g., valid_early, valid, select and burst) may alternatively comprise signals that are encoded in any desired fashion.

Figure 8:
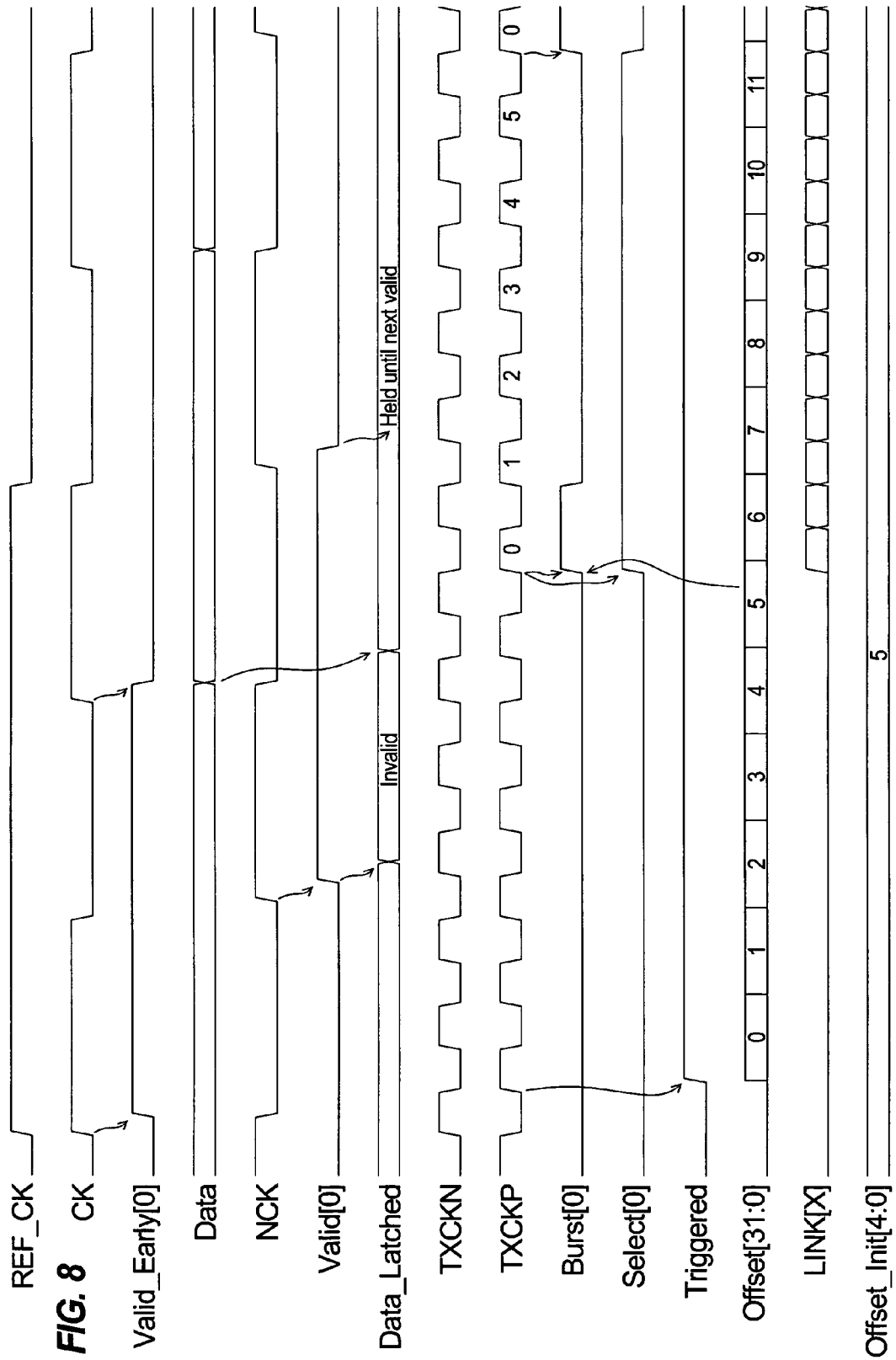
FIG. 8 is an exemplary timing diagram illustrating the timing of the apparatus of FIG. 1.

A timing diagram for the exemplary serializer 10 is illustrated in FIG. 8. Note that the Valid_Early[0] signal is clocked by the core clock CK in the core, so it transitions shortly after CK transitions. The Valid[0] signal is clocked by the inverted core clock NCK, so it transitions shortly after NCK transitions. The Triggered signal is taken at a node just inside the offset logic 132 and is asserted on the first rising TXCKP edge after Valid[0] has been asserted. The value on the data bus Data[119:0] 14 is latched in the FIFO 46 on the first rising edge of the NCK clock after the Valid_Early[0] signal has been asserted and after the Select signal is asserted. This rising edge of NCK latches Valid_Early[0] in a transparent latch 40, causing Valid[0] 52 to be asserted. However, because the Valid_Early signal 16 is asserted before the data actually appears on the data bus Data[119:0] 14, the latched data Data_Latched[119:0] is invalid until the next rising edge of CK, when data appears on Data[119:0] 14. The offset logic 50 is used to add an offset to the synchronized select and burst signals so the data is not read from the FIFO 46 until it is valid. Note also that data enters the transparent latches in the FIFO 14 and is made available at the output (see Data_Latched) as soon as the transparent latches are enabled by the valid signal, the select signal or the serializer clock. This prevents the delay that would otherwise occur if data were not available at the output of the FIFO 14 until the next rising CK clock edge. The affect of the Offset_Init[4:0] delay is illustrated in the timing diagram, wherein Offset_Init[4:0] has the static value 5. The time period in which the Start_Select and Start_Burst signals will be asserted for different values on Offset_Init[4:0] is illustrated by the numbered Offset[31:0] regions.

Figure 9:
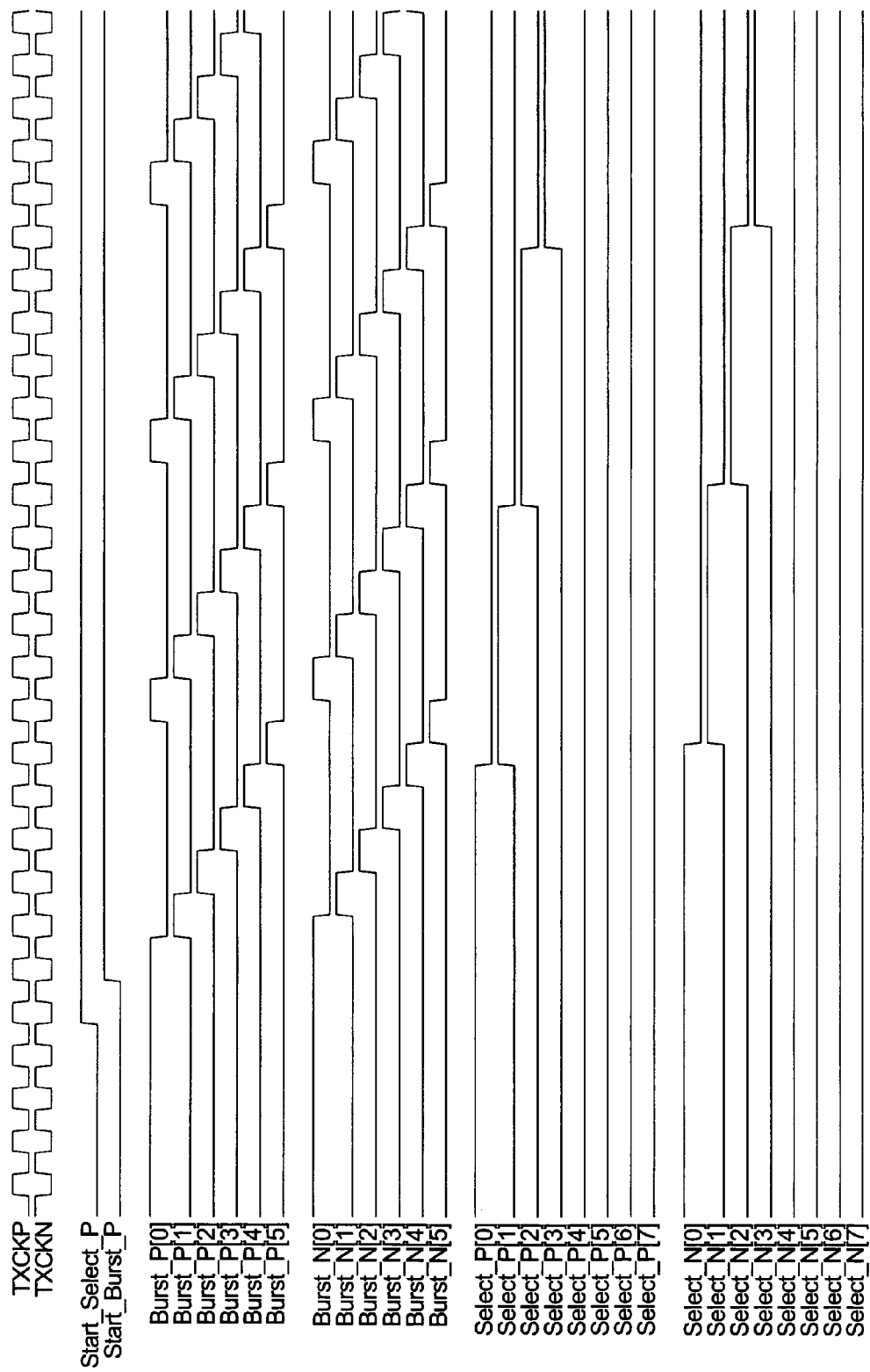
FIG. 9 is an exemplary timing diagram illustrating the timing of the timing/select logic of FIG. 4.

The timing of the synchronizer 10 during the startup period is illustrated in the timing diagram of FIG. 9. Note that Select_P[0], Select_N[0], Burst_P[0] and Burst_N[0] are initially asserted as described above. The one-cycle delay in Start_Burst over Start_Select is also illustrated. Note that the Start_Select_P and Start_Burst_P signals are shown, but not Start_Select_N and Start_Burst_N. As discussed above, the serializer 10 is divided into two halves to create the double pumped output, half clocked by TXCKP and half clocked by TXCKN, although only exemplary portions clocked by TXCKP have been illustrated and discussed in detail herein. The portions clocked by TXCKN are analogous but are delayed by one-half cycle of the serializer clock. The select signals are each asserted for six serializer clock cycles, long enough for each of the six burst signals to be asserted during one select signal assertion.

Figure 10:
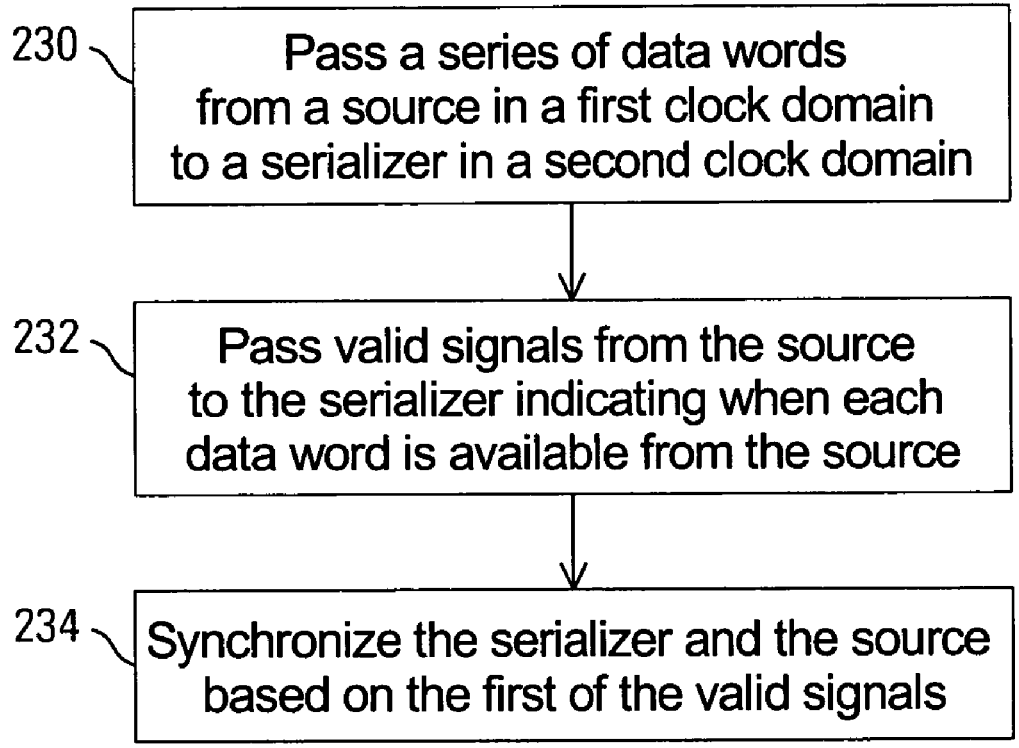
FIG. 10 is a flow chart summarizing an exemplary operation for serializing a data stream.

An exemplary method for serializing a data stream is summarized in the flow chart of FIG. 10. A series of data word is passed 230 from a source in a first clock domain to a serializer in a second clock domain. Valid signals are passed from the source to the serializer indicating when each word is available from the source. The serializer and source are synchronized 234 based on the first of the valid signals.

While illustrative embodiments have been described detail herein, it is to be understood that the concepts disclosed herein may be otherwise variously embodied and employed, and that the appended claims are intended to be trued to include such variations, except as limited by the prior art.

What is claimed is:

1. An apparatus for serializing a data stream, the apparatus comprising:
   a data word input;
   a serial data output, wherein said data word input is wider in data bits than said serial data output;
   a memory having a data input, an output select control input and an output, said data input being connected to said data word input, said output being connected to said serial data output;
   a data word valid input;
   a state machine having an input and an output, said state machine being connected to said data word valid input, said state machine output being connected to said output select control input of said memory, wherein a signal on said state machine output selects data in said memory for output on said memory output; and
   a synchronizing latch chain connected between said data word valid input and said state machine input, said synchronizing latch chain comprising an OR gate having a first input connected to said data word valid input and a second input connected to an output of said synchronizing latch chain, said OR gate having an output connected to an input of a first latch input in said synchronizing latch chain, said output of said synchronizing latch chain being connected to said state machine input so that said synchronizing latch chain output remains asserted after said data word valid input is first asserted.

2. The apparatus of claim 1, said state machine comprising a ring of latches in which an asserted value circulates after said data word valid input has been asserted, said state machine output comprising a plurality of select signals connected to latch outputs at various points of said ring of latches, said plurality of select signals controlling which data is output from said memory.

3. The apparatus of claim 2, wherein ring of latches is clocked by a clock that operates at a higher speed than an external clock associated with data words appearing at said data word input, and wherein said clock and said external clock are not purposely aligned.

4. The apparatus of claim 1, at least one latch in said synchronizing latch chain comprising a resolving latch.

5. The apparatus of claim 1, wherein latches in said synchronizing latch chain are clocked by an internal clock that operates at a higher speed than an external clock associated with data words appearing at said data word input, and wherein said internal clock and said external clock are not purposely aligned.

6. The apparatus of claim 1, said synchronizing latch chain further comprising an offset select multiplexer, said synchronizing latch chain output comprising an output of said offset select multiplexer, said offset select multiplexer having a plurality of inputs each connected to a latch output at a different stages of said synchronizing latch chain to select a delay between said data word valid input first being asserted and said synchronizing latch chain output being asserted.

7. The apparatus of claim 1, said memory comprising a first-in-first-out memory comprising at least one transparent latch, wherein said state machine output periodically selects an oldest entry in said memory for output.

8. The apparatus of claim 1, said memory comprising at least one clock input connected to said data word valid input so that data is stored in said memory at transitions of said data word valid input.

9. The apparatus of claim 1, further comprising an output select multiplexer connected between said memory output and said serial data output, said multiplexer comprising a plurality of inputs, each of which is connected to a portion of said memory output, so that an output of said multiplexer places a portion of a data word at said memory output on said serial data output.

10. The apparatus of claim 9, further comprising a portion select ring of latches in which an asserted value circulates after said data word valid input has been asserted, said portion select ring of latches having a plurality of outputs connected to latch outputs at various points of said portion select ring of latches, said plurality of portion select ring of latches outputs being connected to a control input of said output select multiplexer to periodically select different data word portions for output to said serial data output.

* * * * *